US012023557B2

(12) United States Patent
Mervis (10) Patent No.: US 12,023,557 B2
(45) Date of Patent: *Jul. 2, 2024

(54) VERTICAL JUMP MEASUREMENT SYSTEM

(71) Applicant: The Top Hopper LLC, Metamora, IL (US)

(72) Inventor: Scott Mervis, Metamora, IL (US)

(73) Assignee: The Top Hopper LLC, Metamora, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/140,252

(22) Filed: Apr. 27, 2023

(65) Prior Publication Data

US 2023/0330466 A1    Oct. 19, 2023

Related U.S. Application Data

(63) Continuation of application No. 17/183,769, filed on Feb. 24, 2021, now Pat. No. 11,673,013.

(51) Int. Cl.
*A63B 5/16* (2006.01)
*G01B 3/08* (2006.01)

(52) U.S. Cl.
CPC ............... *A63B 5/16* (2013.01); *G01B 3/08* (2013.01); *A63B 2220/13* (2013.01); *A63B 2225/093* (2013.01)

(58) Field of Classification Search
CPC . A63B 5/16; A63B 2220/13; A63B 2225/093; A63B 71/06; A63B 2244/081; A63B 71/0622; A63B 2071/0694; A63B 2220/20; A63B 5/02; G01B 3/08
See application file for complete search history.

(56) References Cited

U.S. PATENT DOCUMENTS

| | | | | |
|---|---|---|---|---|
| 4,208,050 A * | 6/1980 | Perrine | ............ | A63B 5/16 482/148 |
| 5,031,903 A * | 7/1991 | Clarke | ............ | A63B 5/16 482/148 |
| 5,072,931 A * | 12/1991 | Carlson | ............ | A63B 5/16 482/909 |
| 7,097,589 B2 * | 8/2006 | Underwood | ............ | A63B 5/16 482/15 |
| 7,530,925 B2 * | 5/2009 | Underwood | ............ | A63B 5/16 482/148 |

* cited by examiner

*Primary Examiner* — Andrew S Lo
(74) *Attorney, Agent, or Firm* — UB Greensfelder LLP; Benjamin D. Rotman (57) ABSTRACT

The invention comprises a plurality of indicator members rotatably coupled to an inner slide assembly, the inner slide assembly coupled to an inner channel member, the inner channel member further coupled to an outer channel member. In this configuration, system is mounted to a mounting surface through the outer channel member, the inner channel member is configured in a first state to freely traverse along a vertical axis of the outer channel member and in configured in a second state fixed at a single point on the vertical axis, and inner slide assembly is configured in a first state to freely traverse along a vertical axis of the inner channel member and in a second state fixed at a single point on the vertical axis.

20 Claims, 10 Drawing Sheets

VERTICAL JUMP MEASUREMENT SYSTEM

CROSS-REFERENCE TO RELATED APPLICATION

The present application is a continuation of, claims priority to and the benefit of U.S. patent application Ser. No. 17/183,769 filed Feb. 24, 2021, the contents of which are incorporated herein by reference and made a part hereof.

BACKGROUND OF THE INVENTION

The present invention generally relates to the field of vertical jump measurement. More particularly, the invention relates to a system configured to measure the vertical jump height of an athlete.

The vertical jump is the act of jumping in the air against gravity to raise oneself off of the ground. In athletics, a vertical jump is often referred to as a measure of how high an individual or athlete can elevate off of the ground.

To measure the vertical jump two measurements are required. The first measurement is the standing reach. The athlete will stand with both feet flat on the ground and reaching up with one hand. The height of the standing reach is recorded. The second measurement is the highest reach by the athlete during the peak of the athlete's jump. The athlete will jump up as high as possible and reach one hand up during the peak of the jump striking an indicator. That measurement is recorder. The difference between the standing reach and the reach attained during the peak of the jump is the height of the athlete's vertical jump.

Conventional vertical jump measuring devices of the prior art are configured similarly. Conventional designs rely on an indicator assembly mounted to a telescopically extending stand. The stand is extended vertically until the indicator assembly reaches the correct height from the ground. Conventional designs use telescopic steel tubes to support the weight of the mounted indicator assembly, and withstand the force of the moment arm created by the mounting of the indicator assembly and raising the highest indicator to a height 12 feet from the ground. In order to accommodate such a weight and moment arm, steel is the only material that can be used.

Typically, steel is painted or coated in oil to prevent corrosion. Telescopic steel tubes, however, should not be painted because this would impact clamping and wear off during use. Because of this conventional devices use telescopic steel tubes with no rust prevention. Corrosion of the tubes is a major problem and prevents the athlete from easily extending and retracting the telescopic tubes. All mounting structures for measuring devices should be very rigid and have solid mechanical joints. Devices of the prior art suffer here because the mounting structures cannot achieve this because they need telescopic capabilities.

In addition to the functionality of the device, the athlete must be able to easily record their standing reach and their measurement at the peak of their jump from the ground; prior art devices make this task very difficult. Some prior art device indicators either lack numeric indicia or provide numeric indicia that are not easily read or do not correlate properly with the height the indicator measures from the ground. While some measurements are etched into the tubes, the etching on the telescopic steel tubes is hard to read and hard to correlate to the position of the indicators. The athlete has to record the etched number on the extension tube and then add the number on the indicator to get the standing reach height or jump height. With prior art devices the athlete needs to use a tape measurer. Prior art devices do not have positive stops integrated into the extension tube design. This means the athlete will have to determine when and where to stop the tubes when extending or retracting the tubes. All of these issues will lead to errors in recording the athlete's measurements.

The present invention seeks to address the shortcoming of the prior art by providing a lighter weight, mountable, and easily extendable system designed to provide reliable, accurate, and reproducible measurements for athletes measuring vertical jump height.

SUMMARY OF THE INVENTION

In view of the above, a vertical jump height measurement system and method is provided. The advantage of the present invention is that it allows for a relatively light weight, durable, adjustable, and repeatable measuring system. The system as described may be mounted to a mounting surface including but not limited to a stand, a wall, a basketball hoop, a volleyball net pole, and is telescopically adjustable for ease of use.

In a first aspect of the invention, the system is mounted to a mounting surface. The system comprises a plurality of indicator members rotatably coupled to an inner slide assembly, the inner slide assembly coupled to an inner channel member, the inner channel member further coupled to an outer channel member. In this configuration, the system is mounted to a mounting surface through the outer channel member, the inner channel member is configured in a first state to freely traverse along a vertical axis of the outer channel member and is configured in a second state fixed at a single point on the vertical axis, and inner slide assembly is configured in a first state to freely traverse along a vertical axis of the inner channel member and in a second state fixed at a single point on the vertical axis.

In some aspects, multiple inner channel members are coupled adjacent to each other with the outer channel member coupled at first end of the inner channel assembly and the inner slide assembly coupled at a second end of the inner channel assembly. One of skill in the art will recognize that the additional inner channel members provide for additional height adjustments.

In yet another aspect of the invention, the inner channel assembly comprises a plurality of indicator members rotatably coupled to an indicator rod, and the indicator rod coupled to an inner slide member. In some aspects of this configuration, a strike rod is additionally coupled the inner slide member. In these aspects, the strike rod is configured to prevent over rotation of the indicator members.

In another aspect, a method of using the system comprises the steps of mounting the system such that that the top indicator member is at a predetermined maximum height, measuring an athletes vertical jump by recording the top indicator that was reached by the athlete, if no indicator is reached, lowering maximum height of the indicator members by extending the inner slide assembly into an extended position and measuring an athletes vertical jump by recording the top indicator that was reached by the athlete, if no indicator is reached, lowering maximum height of the indicator members by extending the inner channel member into an extended position and measuring an athletes vertical jump by recording the top indicator that was reached by the athlete.

The methods, systems, apparatuses are set forth in part in the description which follows, and in part will be obvious from the description, or can be learned by practice of the methods, apparatuses, and systems. The advantages of the methods, apparatuses, and systems will be realized and attained by means of the elements and combinations particularly pointed out in the appended claims. It is understood that both the foregoing general description and the following detailed description are exemplary and explanatory only and are not restrictive of the methods, apparatuses, and systems, as claimed.

BRIEF DESCRIPTION OF THE DRAWINGS

In the accompanying figures, like elements are identified by like reference numerals among the several preferred embodiments of the present invention.

Other aspects and advantages of the present invention will become apparent upon consideration of the following detailed description, wherein similar structures have similar reference numerals.

DETAILED DESCRIPTION OF THE PREFERRED EMBODIMENTS

The foregoing and other features and advantages of the invention will become more apparent from the following detailed description of exemplary embodiments, read in conjunction with the accompanying drawings. The detailed description and drawings are merely illustrative of the invention rather than limiting, the scope of the invention being defined by the appended claims and equivalents thereof.

As shown in FIGS. 1-6, in an exemplary embodiment, the system 10 is mounted to a mounting surface 12. The system 10 comprises an inner slide assembly 100 coupled to an inner channel member 200, the inner channel member 200 further coupled to an outer channel member 300. In this configuration, system 10 is mounted to a mounting surface 12 through the outer channel member 300, the inner channel member 200 is configured in a first state to freely traverse along a vertical axis 302 of the outer channel member 300 and fixed at a single point on the vertical axis 302 in a second state, and inner slide assembly 100 is configured in a first state to freely traverse along a vertical axis 202 of the inner channel member 200 and fixed at a single point on the vertical axis 202 in a second state. The mounting surface 12 may include but is not limited to a wall, a stand, a poll, or even a basketball hoop. The outer channel member 300 is either mounted directly to the mounting surface 12 or mounted through a mounting bracket (not shown). The inner channel member 200 is disposed with the outer channel member 300 and its vertical movement is constrained by an outer channel top cap 304 on the upper end and an outer channel lower cap 306 at the bottom end. In a retracted state, the inner channel member 200 is held at a top position within the outer channel member 300 through the use of a detent assembly 208. In an expanded position, the outer channel bottom cap 306 interferes with an inner channel top cap 204 preventing the inner channel member 200 from sliding completely out of the outer channel member 300 bottom end. An inner slide assembly 100 comprising an inner slide member 102 is disposed within the inner channel member 200 and is constrained in vertical direction by the inner channel top cap 204 and inner channel bottom cap 206. In a retracted state, the inner slide member 102 is held at a top position within the inner channel member 200 through the use of a detent assembly 122. In an expanded position, the inner channel bottom cap 206 interferes with an inner slide member top guide 120 preventing the inner slide assembly 100 from sliding completely out of the inner channel member 200 bottom end. One of skill in the art would recognize that multiple inner channels members 200 may be assembled in order to achieve the desired height for measurement and that inner slide member 102 may be referred to as a first inner slide member.

Figure 1:
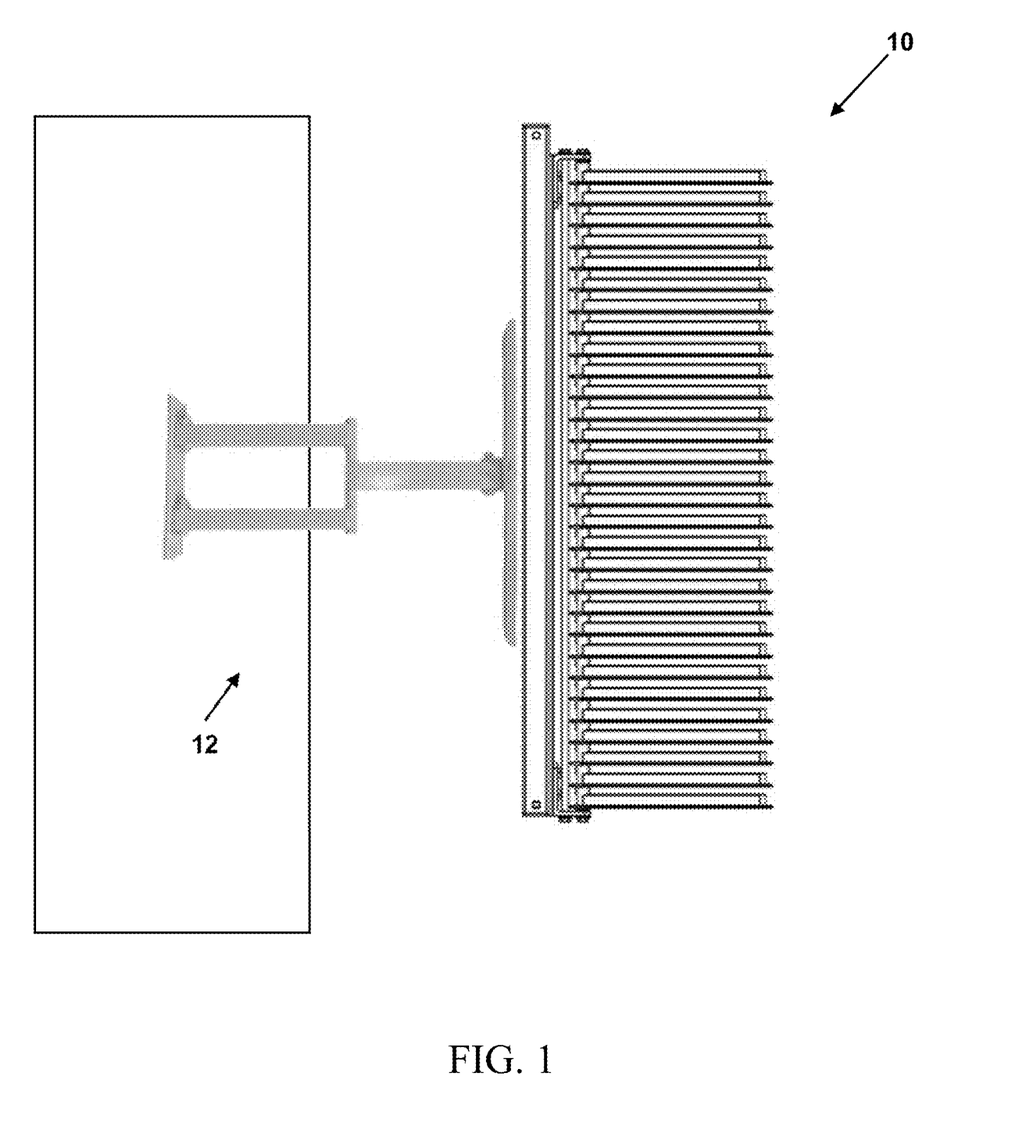
FIG. 1 depicts the assembled system mounted to an environment.
Figure 2:
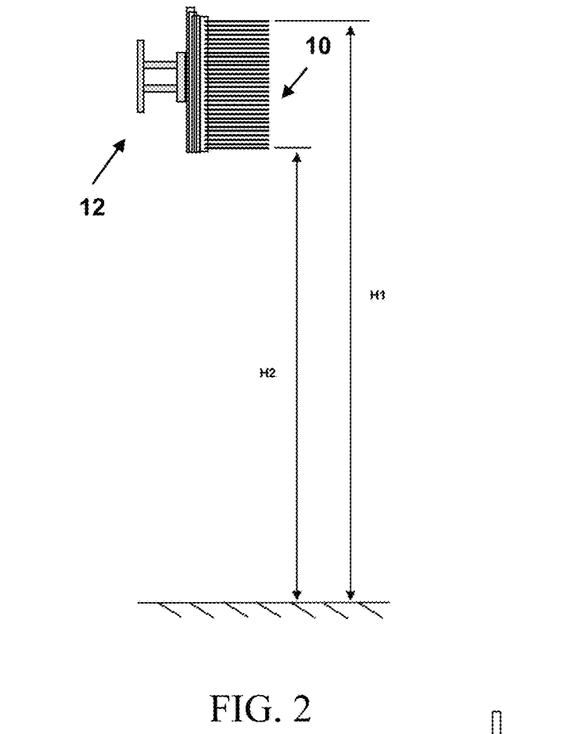
FIG. 2 depicts the system in a first retracted position.
Figure 3:
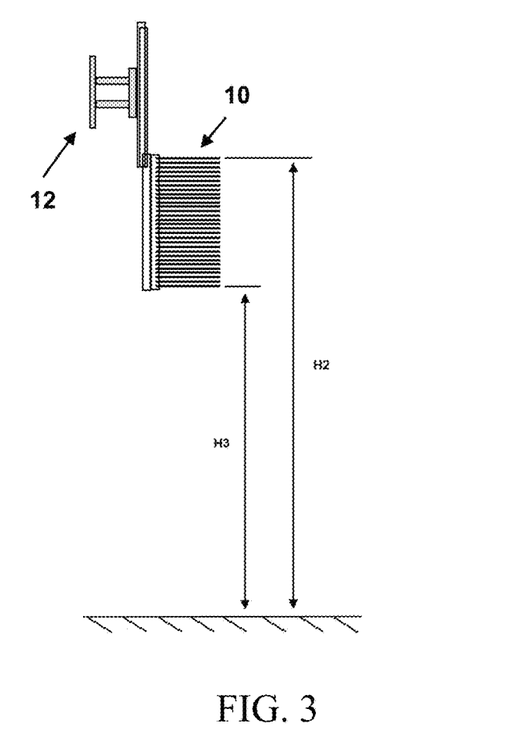
FIG. 3 depicts the system in a semi-retracted position.
Figure 4:
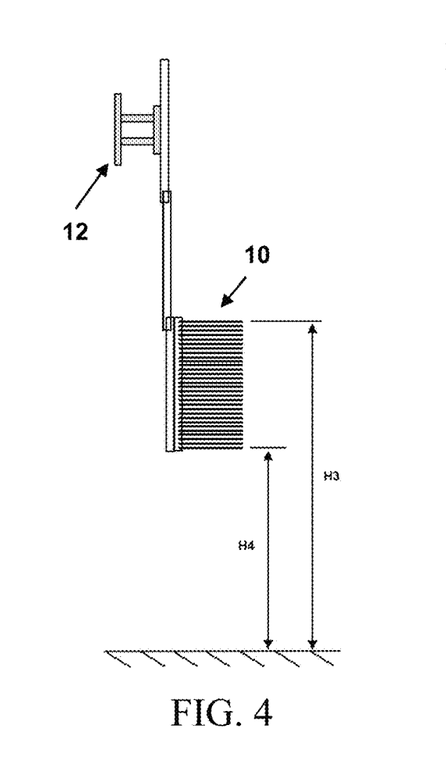
FIG. 4 depicts the system in a fully expanded system.
Figure 5:
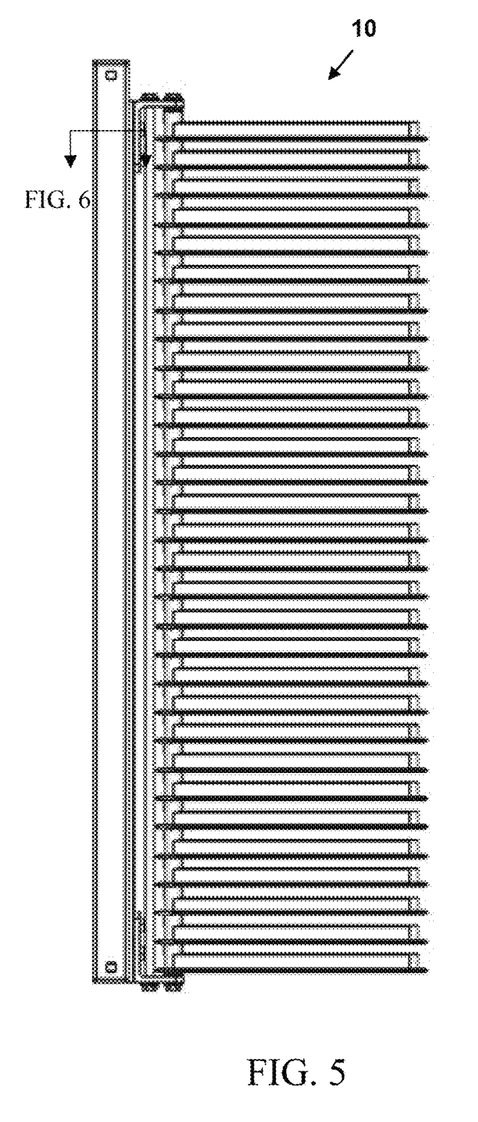
FIG. 5 depicts the assembled system.

In one example embodiment of system 10, the nested channel assembly design allows the athlete to extend and retract the channel assembly with a full measurement range of seven feet. The system 10 ensures the indicators 110 are in the same location each and every time the inner slide assembly 100 and the inner channel member 200 are extended. In this configuration, The telescopic assembly of the system 10 can be extended and retracted by using an adjuster rod or by hand by pulling down or pushing up on the inner slide assembly 100. In configurations having a single inner channel member 200, the system 10, has three positions. In position 1, as show in FIG. 2, the system 10 is in the fully retracted or starting position. In this position, the top indicator 110a will be at H1 (144 inches (12 feet) for example) from the ground and the bottom indicator will be at H2 (118 inches for example) from the ground. In position 2, as shown in FIG. 3, the system 10 is in a semi-extended position, which is halfway between a fully retracted position and a completely extended position. The athlete will use the adjustment pole or hand to extend the assembly by pulling down. In one example, the detent assembly 122 requires only four pounds of force to lower the inner slide assembly 100 by releasing the inner slide member 102. The detent force may be higher or lower to make it harder or easier to activate and slide. The inner slide member 102 will extend downward and then hit a positive stop of the inner channel member bottom cap 206. When the assembly is in this position, the top indicator will be at H2 (118 inches for example) inches from the ground and the bottom indicator will be at H3 (89 inches for example) from the ground. In position 3, as shown in FIG. 4, the system 10 is in a completely extended position. The athlete will use the adjustment pole to extend the assembly or by pulling down on the assembly. In one example, the detent assembly 208 requires only eight pounds of force to lower the indicator assembly by releasing the inner channel member 200. The inner channel member 200 will extend downward and then hit a positive stop of the outer channel bottom cap 306.

When the system 10 is in this position, the top indicator will be at H3 (89 inches for example) from the ground and the bottom indicator will be at H4 (60 inches for example) from the ground. One of skill in the art will recognize that the heights and forces listed above are exemplary and depending on the athlete, desired height measurement range, mounting surface, extension ease, the heights or forces may increase or decrease.

Figure 7:
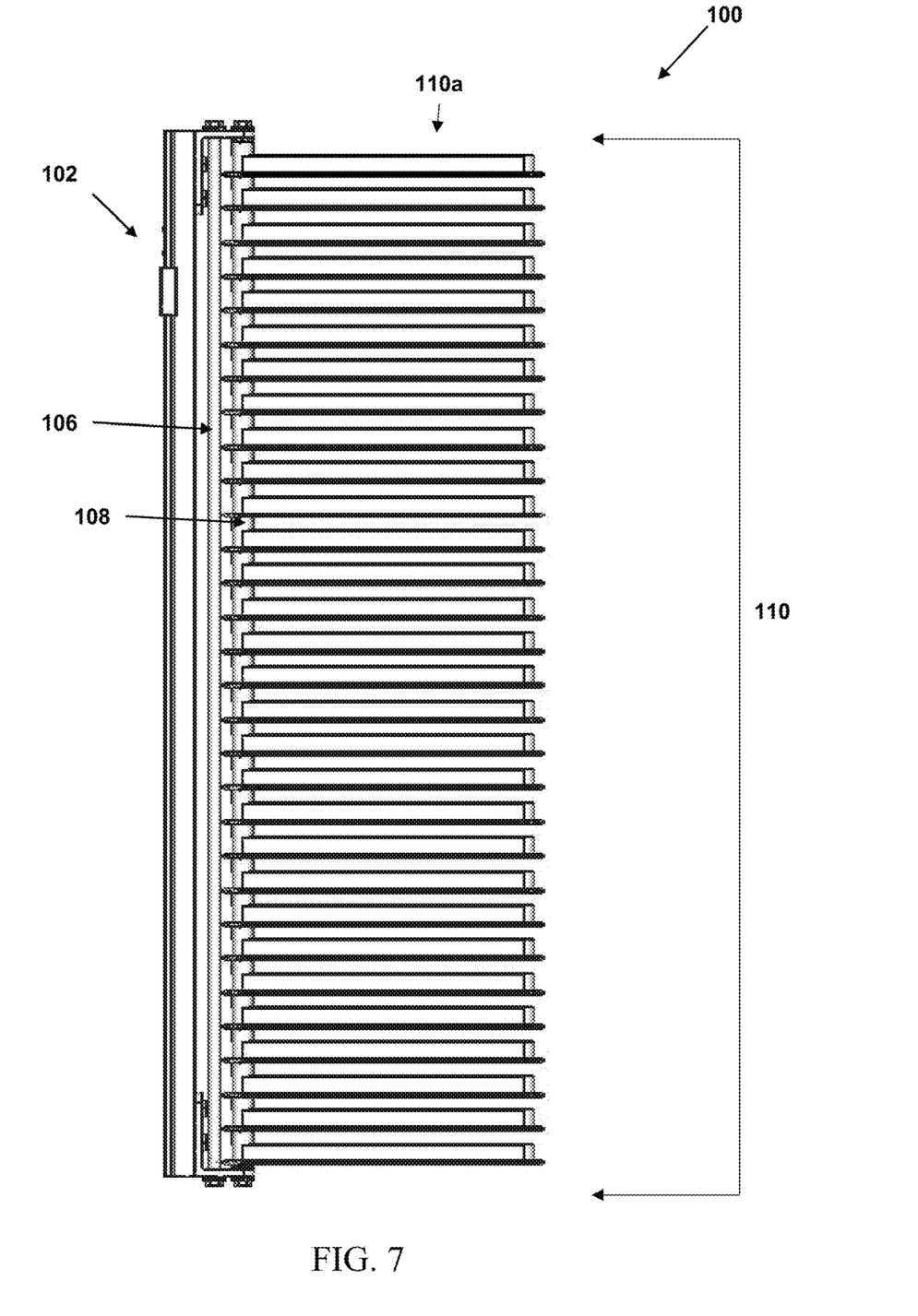
FIG. 7 depicts the inner slide assembly.
Figure 8:
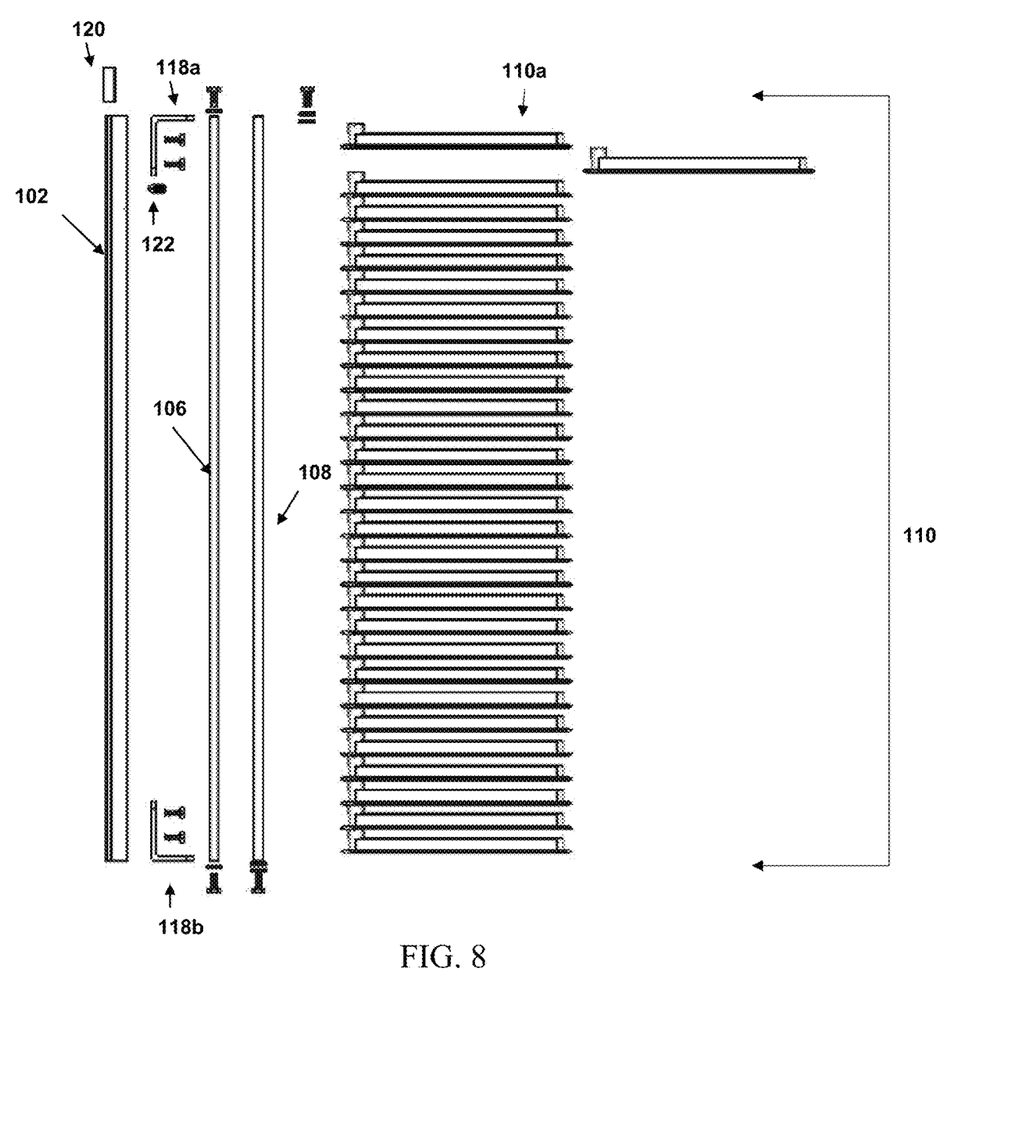
FIG. 8 depicts an exploded view of the inner slide assembly.

FIGS. 7 and 8 details the inner slide assembly 100. As shown in FIG. 3, the inner slide assembly 100 comprises an inner slide member 102, a strike rod 106, an indicator rod 108, and a plurality of indicator members 110. In this configuration, they plurality of indicator members 110 are rotatably coupled to the indicator rod 108, and in turn the indicator rod 108 is coupled to the inner slide member 102. The strike rod 106 is coupled to the inner slide member 102 intermediate the indicator rod 108 and the inner slide member 100. The strike rod 106 is positioned and configured to stop over rotation of the plurality of indicator members 110. In some configurations the inner slide member 102 itself may act as the strike rod 106 or indicator rod 108 and the components may be a unitarily formed piece.

Figure 11A:
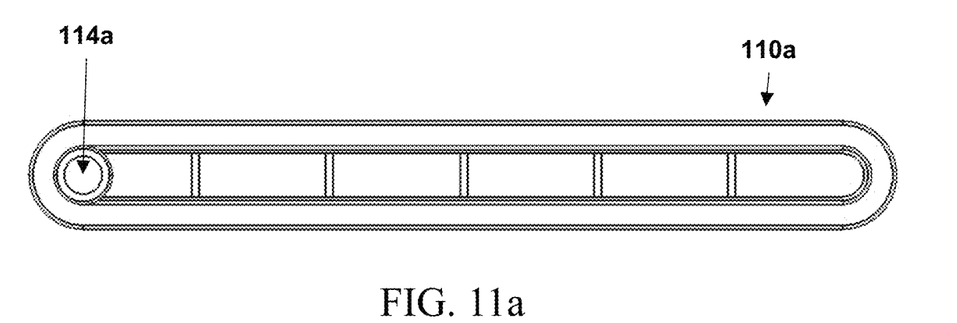
FIGS. 11a-11c depict an indicator member.
Figure 11B:
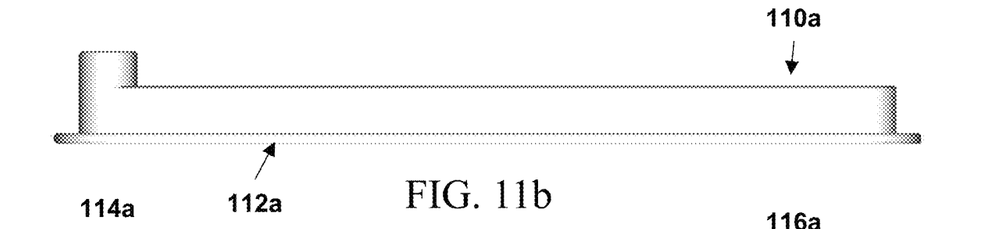
Figure 11C:
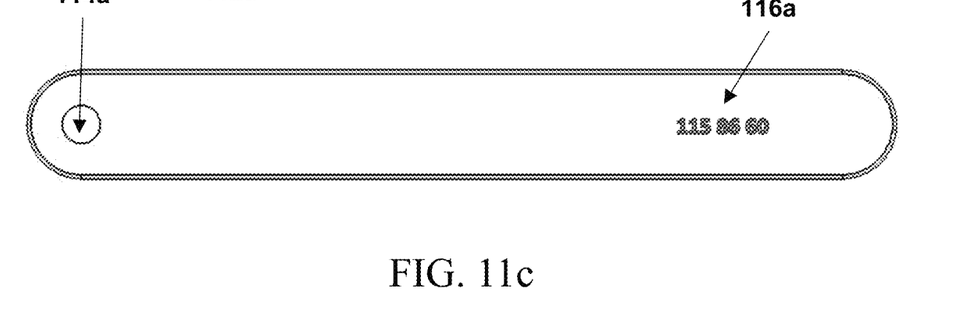

As shown in FIGS. 11a-11c, each indicator member 110a of the plurality of indicator members 110 is configured to rotatably couple to the indicator rod 108. In one configurations each indicator member 110a may comprise an elongated body 112a and an indicator rod bore 114a. In this configuration, the indicator rod bore 114a is configured to accommodate the indicator rod 108 and in some aspects may be raised above the elongated body 112a to act as a spacer element between indicator members 110 in the inner slide assembly 100. In some aspects, the indicator rod bore 114a may be a partial bore allowing the indicator member 114a to be clipped or snapped on to the indicator rod 108. The height of the indicator members 110 may vary for accuracy and resolution of measurement. For example if an indicator members 110 are one inch tall, and a user jumps and hits the seventh indicator member 110, the user would know that they jumped seven inches from the bottom of the first indicator member 110.

In some configurations, the indicator members 110 further comprise a numeric indicia 116a indicating the height of the particular indicator member 110a relative to the ground, relative to the first indicator, or relative expanded or retracted positions contemplated previously. One of skill in the art would recognize that the indicia 116a may be molded, adhered, screened, written, painted, or applied in any conventional means known in the art. In other aspects, the indicator members 110 may alternate in color for easier visibility from the ground. In one example, a film (label/decal) is placed on the bottom side of each indicator. This film contains a number which corresponds to the position and location on the indicator 110a with respect to the ground. In this example the system 10 has three positions from the ground, each indicator 110a will have three numeric indicia 116a each correlating to the retracted, semi-retracted, and expanded positions. These numbers make it very easy for the athlete to measure the height of their reach and thus determine the height of their vertical jump.

While the indicator members 110 may be made of any material, one of skill in the art may recognize that an ABS plastic may allow the indicator member 110 to handle consistent abuse from the force of being stricken during a jump and from a full range of weather conditions if mounted outdoors.

Figure 12:
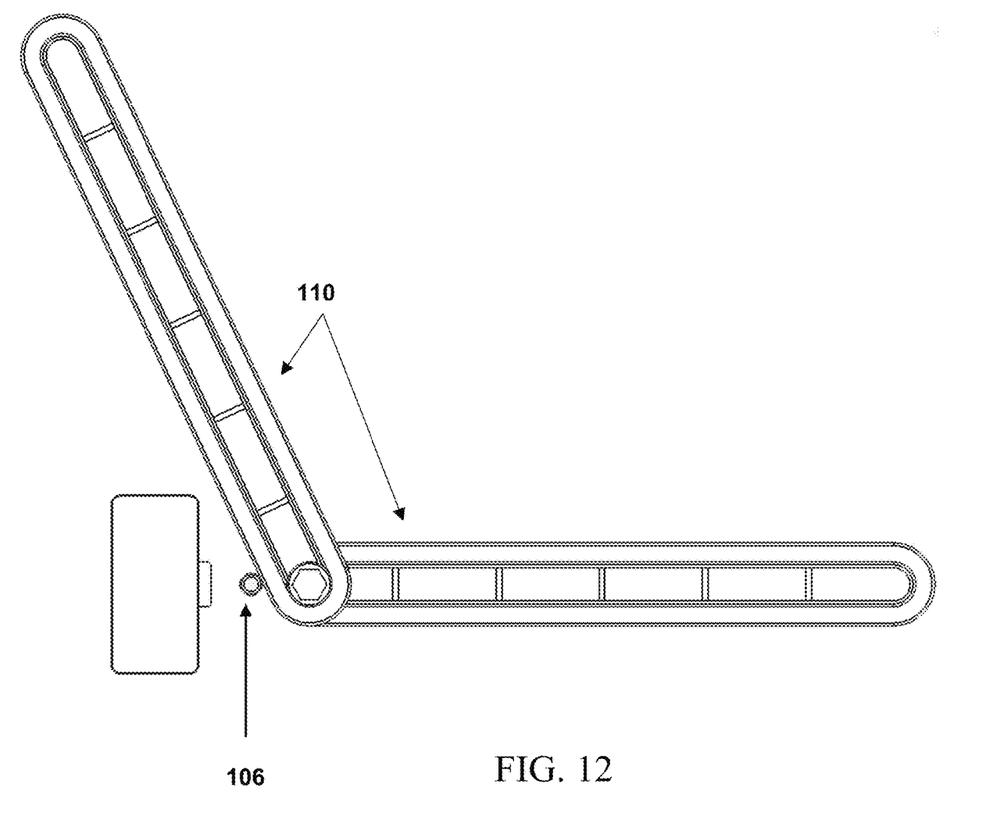
FIG. 12 depicts an indicator member interaction with the shock member.

The indicator rod 108 and strike rod 106 are coupled to the inner channel member 200 through coupling members 118a and 118b. The indicator rod 108 is configured to constrain the indicators 110 in a horizontal direction, while the coupling members 118 constrain the indicators 110 in the vertical direction. As shown in FIG. 12 the strike rod 106 may be a rod or tube that is positioned to prevent over rotation on the indicators 110. Without the strike rod 106 the indicators 110 could break during retraction of the system 10 by contacting the inner channel member 200 or outer channel member 300. In one configuration the coupling members 118a and 118b are brackets mounted at opposing ends of the indicator rod 108 and strike rod 106 that are in turn secured to the inner slide member 102. In one example, two "L-shaped" indicator brackets 118a and 118b are secured to the inner slide member 102 using two bolts and two washers for each bracket 118a, 118b. One indicator bracket 118a is installed on top of the indicator rod 108 and strike rod 106. The bottom indicator bracket 118b is installed to the bottom of the indicator rod 108 and strike rod 106. In another configuration without the strike rod 106 the brackets are extended a length longer than the indicator member elongated body 112a allowing the indicator members 110 to freely rotate 360 degrees without contacting the inner slide member 102. In some aspects the indicator rod 108 and strike rod 106 have threaded tapped holes on each end, are installed through holes in the brackets 118a and 118b and secured to the bracket 118 through conventional hardware such as a washers and bolts. One of skill in the art would recognize that the brackets 118a and 118b may not be separate pieces, but rather integral to the inner slide member 102.

In one example, the indicator rod 108 is a ⅜" steel rod that holds the indicators 110 in place. The indicators 110 rotate perpendicular to the vertical axis of the indicator rod 108. While the indicator rod 108 may be any material, one of skill in the art would recognize a rigid rod prevents bending and helps to maintain proper spacing and rotation of the indicators 110.

Figure 6:
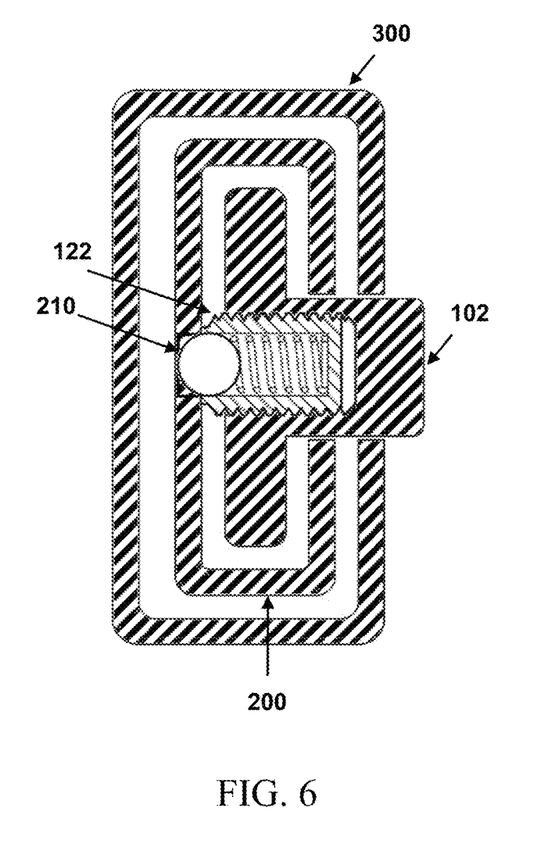
FIG. 6 depicts a partial transverse cross-section of the assembled system.
Figure 13:
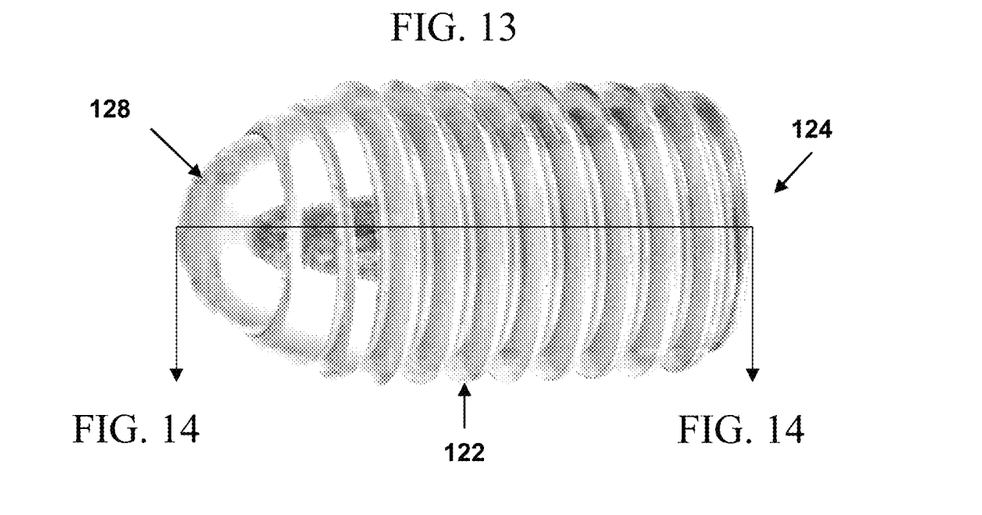
FIG. 13 depicts the detent assembly.
Figure 14:
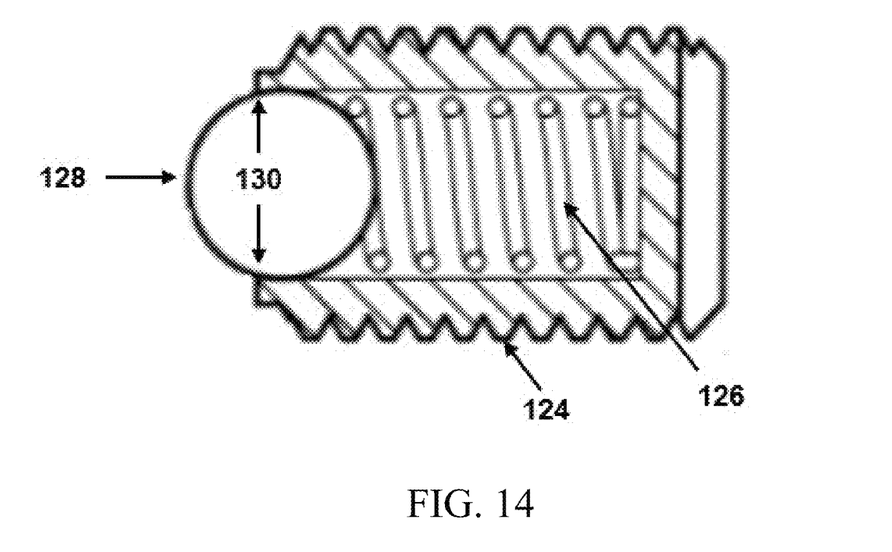
FIG. 14 depicts a cross-section of the detent assembly of FIG. 13.

The inner slide member 102 is the base component of the inner slide assembly 100 and is coupled to the inner channel member 200. The inner slide member 102 further comprises inner slide top guide members 120 coupled to the top or formed as a part of the top of the inner slide member 102 and at least one inner slide detent assembly 122. The top guide members 120 allow the inner slide member 102 to smoothly vertically traverse the inner channel member 200. The top guide members 120 also act as a stop preventing the inner slide member 102 from traversing out of the inner channel member 200 when the top guide members 120 are obstructed by a bottom cap feature 206 of the inner channel member 200. As shown in FIGS. 6, 13 and 14 the inner detent assembly 122 comprises a detent assembly housing 124, a retention member 126 and a ball bearing 128. The ball bearing 128 and retention member 126 are disposed within the detent assembly housing 124. The detent assembly housing 124 further comprises and opening 130 smaller than the diameter of the ball bearing 128 allowing a portion of the ball bearing 128 to be exposed and protrude through the opening 130. In an expanded state, the retention member 126 retains the ball bearing against the opening 130. In operation, the detent assembly housing 124 is secured to the inner slide member 102 and the retention member 126 (in some embodiments a spring) retains the ball bearing 128 within a detent feature 210 of the inner channel member 200. In some aspects, the detent feature 210 may be a hole, opening, or surface depression within inner channel member 200. The detent feature 210 constrains the inner slide member 102 in a fixed position along the vertical axis 202 of the inner channel member 200. When a force is applied to the ball bearing 128 greater than the force applied by the retention member 126, the ball bearing 128 will partially retract into the detent assembly housing 124, compressing the retention member 126 and disengage from the detent feature 210. Upon disengagement, the inner slide member 102 may freely traverse down the vertical axis 202 of the inner channel member 200 while the ball bearing 128 smoothly rolls down the inner surface of inner channel member 200. In some aspects the detent assembly housing 124 is threaded to install into a complimentary threaded opening on the inner slide member 102 or the inner channel member 200 while in other aspects the assembly housing 124 is snapped in or welded onto the inner slide member 102 or the inner channel member 200.

Figure 9:
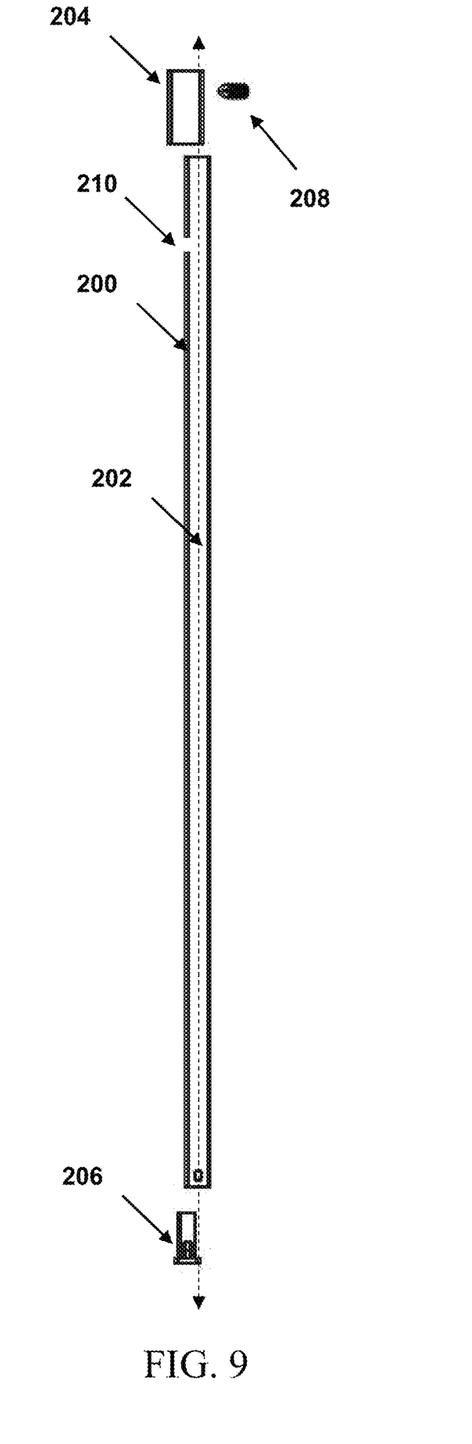
FIG. 9 depicts an exploded view of the inner channel member.

In one configuration, the inner slide member 102 has a "T" shaped transverse cross-section while the inner channel 200 member has a "C" shaped transverse cross-section. In this aspect, the inner slide member 102 is disposed within the inner channel member 200 and horizontally constrained by the respective cross-section geometries. The inner channel member, As shown in FIGS. 6 and 9, 200 further comprises an inner top cap 204 and an inner bottom cap 206. The inner slide member 102 may freely traverse the vertical axis 202 of the inner channel member 200 between the inner channel top cap 204 and the inner channel bottom cap 206. The inner channel member 200 or the inner channel top cap 204 comprises at least one inner channel detent assembly 208 similarly configured to the inner slide detent assembly 122 however the inner channel detent assembly 208 comprises a higher retention force. The higher retention force may be a result of a stronger retention member 126 or simply that there are just more detent assemblies 208 installed effectively increasing the retention force. The outer channel 300 comprises mating detent features 308 similar to the detent feature 210 to align with and constrain movement of the inner channel member 200. The inner channel detent member 208 is configured to hold the inner channel member 200 in place along the outer channel member vertical axis 302 until the user applies an additional force and extends the inner channel member 200.

Figure 10:
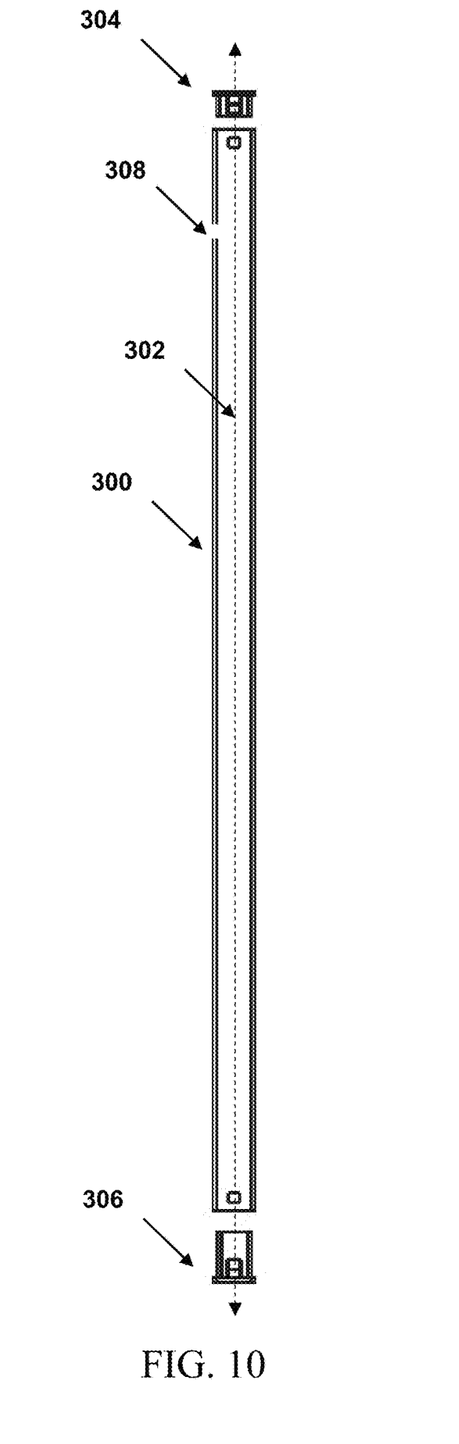
FIG. 10 depicts an exploded view of the outer channel member.

As shown in FIGS. 6 and 10, the outer channel member 300 comprises a "C" shaped transverse cross-section configured to accommodate and horizontally contain the inner channel member 200 transverse cross-section. The outer channel member 300 further comprises an outer top cap 304 and an outer bottom cap 306 The inner channel member 200 may freely traverse the vertical axis 302 of the outer channel member 300 between the outer channel top cap 304 and the outer channel bottom cap 306. The outer top cap 304 may be a plastic molded part coupled to the top of the outer channel member 300 or a part formed with or to the outer channel member. The outer bottom cap 306 may be plastic molded part (or formed with the outer channel member 300) that acts as a positive stop against the inner channel top cap 204 and a slide against the inner channel member 200.

In another aspect, a method of using the system comprises the steps of mounting the system such that the top indicator member is at a predetermined maximum height, measuring an athletes vertical jump by recording the top indicator that was reached by the athlete, if no indicator is reached, lowering maximum height of the indicator members by extending the inner slide assembly 100 into an extended position and measuring an athletes vertical jump by recording the top indicator 110 that was reached by the athlete, if no indicator is reached, lowering maximum height of the indicator members by extending the inner channel member 200 into an extended position and measuring an athletes vertical jump by recording the top indicator 110 that was reached by the athlete.

Figure 15:
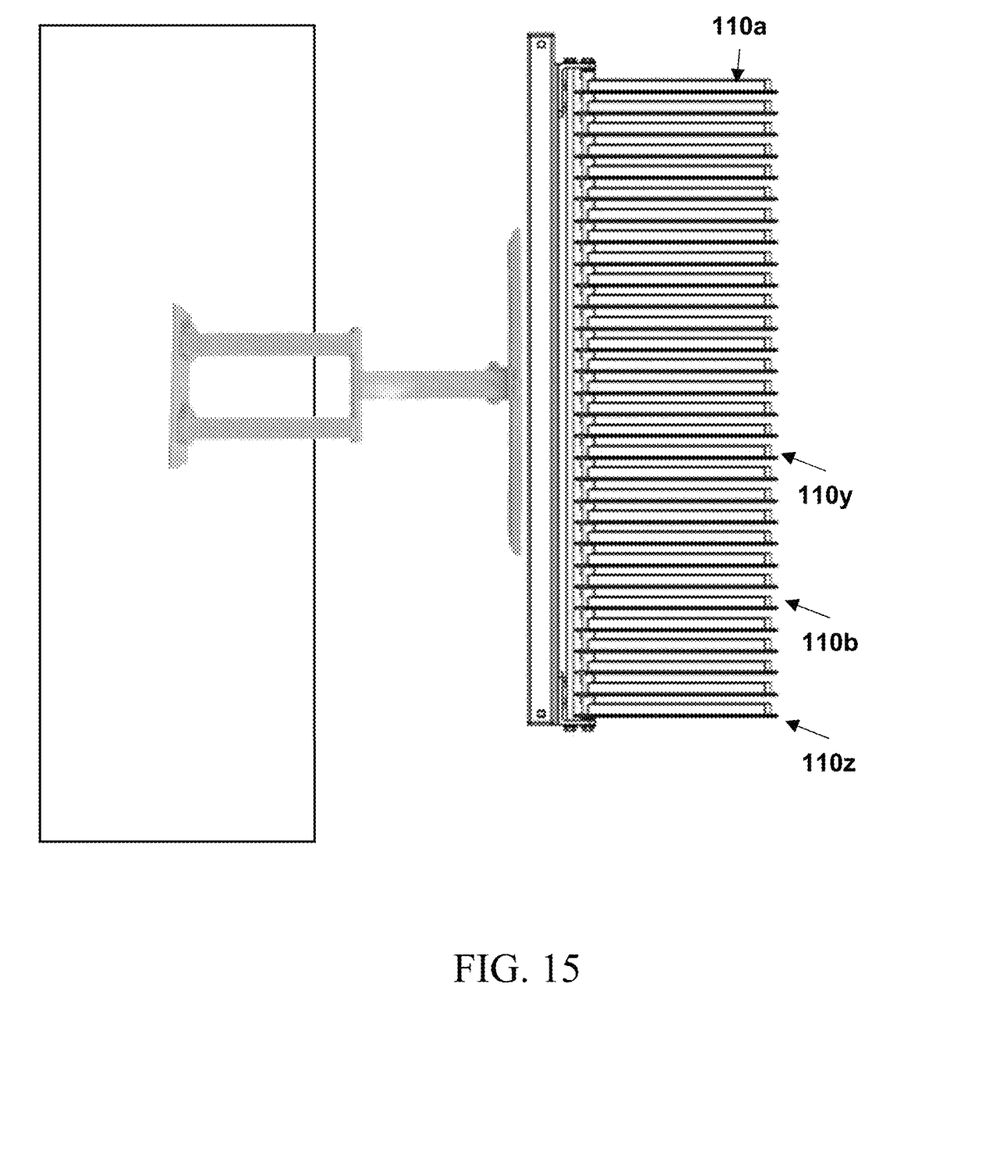
FIG. 15 depicts the system used for an example measurement.

Further the method may comprise the steps of: mounting the system 10 to an external surface 12 such that that a top indicator member 110a of the plurality of indicator members 110 is at a predetermined maximum height; extending the inner channel member 200 and inner slide assembly 100 to a height in which an athlete can stand and strike at least a bottom indicator 110z members of a plurality of indicator members 110; recording a numeric indicia 116 of a highest indicator member 110b stricken by the athlete in standing position; retracting the inner channel member 200 or inner slide assembly 100 until the athlete can jump and strike an indicator member 110y at a peak reach point of the athlete; recording a second numeric indicia of a highest indicator member stricken by the athlete in jumping position; and calculating a vertical jump measurement by calculating the difference between jumping and standing heights. In the example show in FIG. 15, the indicator members 110 have a height of one inch, the athlete has a standing reach hitting indicator 110b, and a jumping reach hitting indicator 110y. In this example the difference in height between 110y and 110b is six indicator member, or six inches, indicating a vertical jump height of six inches.

The step of extending the inner channel member 200 and inner slide assembly 100 further comprise the steps of: applying a force greater than the retention force of the inner slide member detent assembly 122 to the ball bearing 128, retracting the ball bearing 128 further into the detent assembly housing 124 and out of the detent feature; sliding the inner slide assembly 100 downward along the vertical axis of the inner channel member until the inner slide member top guide interferes with the inner channel member bottom cap 206; applying a force greater than the retention force of the inner channel member detent assembly 208 to the ball bearing 128, retracting the ball bearing 128 further into the detent assembly housing 124 and out of the detent feature; and sliding the inner channel member 200 downward along the vertical axis 302 of the outer channel member 300 until the inner channel member top cap 204 interferes with the outer channel member bottom cap 306.

The step of retracing the inner channel member 200 and inner slide assembly 100 further comprise the steps of: sliding the inner slide assembly 100 upward along the vertical axis of the inner channel member 202 until the retention force biases the ball bearing 128 into the inner channel member detent feature; and sliding the inner channel 100 upward along the vertical axis 302 of the outer channel member until the retention force biases the ball bearing 128 into the outer channel member detent feature.

In one aspect of the invention, inner slide member 102, inner channel member 200, and outer channel member 300 are extruded aluminum members.

Those of ordinary skill in the art will understand and appreciate the aforementioned description of the invention has been made with reference to certain exemplary embodiments of the invention, which describe a vertical jump measurement system and method of use. Those of skill in the art will understand that obvious variations in construction, material, dimensions or properties may be made without departing from the scope of the invention which is intended to be limited only by the claims appended hereto.

The invention claimed is:

1. A vertical jump measuring system comprising:
an inner slide assembly including an inner slide member, an indicator rod, and a plurality of indicator members, wherein the indicator rod is coupled to the inner slide member and the plurality of indicator members are rotatably coupled to the indicator rod;
the inner slide assembly coupled to a first inner channel member, the inner slide assembly, in a first state, fixed in an inner slide assembly retracted position along a first inner channel member vertical axis and in a second state freely traverses down the first inner channel member vertical axis until the inner slide assembly is fixed in an inner slide assembly extended position; and
the first inner channel member coupled to an outer channel member, the first inner channel member, in a first state, fixed in a first inner channel member retracted fixed position along an outer channel member vertical axis and in a second state freely traverses down the outer channel member vertical axis until the first inner channel member is fixed in a first inner channel member extended position.

2. The vertical jump measuring system of claim 1 wherein the inner slide member comprises a "T"-shaped transverse cross-section, the first inner channel member comprises a "C"-shaped transverse cross-section, and the outer channel member comprises a "C"-shaped transverse cross-section; and
further wherein the inner slide member is disposed within the first inner channel member and the first inner channel member is disposed within the outer channel member.

3. The vertical jump measuring system of claim 2 wherein the inner slide member further comprises an inner slide member top guide disposed at an inner slide member top end and an inner slide member detent assembly coupled to and disposed toward the inner slide member top end;
further wherein the first inner channel member comprises a first inner channel top cap disposed at a first inner channel member top end, a first inner channel bottom cap having an inner slide member opening disposed at a first inner channel bottom end, a first inner channel member detent feature disposed toward first inner channel top end, and a first inner channel detent assembly disposed towards the first inner channel member top end;
further wherein the outer channel member comprises an outer top cap disposed at an outer channel member top end, an outer channel bottom cap having an inner channel member opening disposed at an outer channel bottom end, and an outer channel member detent feature disposed toward outer channel member top end;
further, while in the inner slide assembly retracted position, the inner slide member detent assembly engages the first inner channel member detent feature and holds the inner slide member in a fixed position and while transitioning to the inner slide assembly extended position, the inner slide member detent assembly disengages the first inner channel member detent feature and traverses towards the first inner channel member bottom end through the inner slide member opening, and is stopped in the inner slide assembly extended position by an interference between the inner slide member top guide and the first inner channel bottom cap; and
further, while in the first inner channel retracted position, the first inner channel member detent assembly engages the outer channel member detent feature and holds the first inner channel member in a fixed position and while transitioning to the first inner channel member extended position, the inner channel member detent assembly disengages the outer channel member detent feature and traverses towards the outer channel member bottom end through the inner channel member opening, and is stopped in the first inner channel extended position by an interference between the first inner channel member top cap and the outer channel member bottom cap.

4. The vertical jump measuring system of claim 3 where the inner slide member detent assembly and inner channel member detent assembly comprise a ball bearing, a retention member, and a detent housing having a ball bearing opening smaller than the ball bearing; and
further wherein the ball bearing and the retention member are disposed with the detent housing and the retention member provides a retention force upon the ball bearing, biasing the ball bearing against the ball bearing opening, partially exposing the ball bearing until a force greater than the retention force biases the ball bearing back into the detent housing.

5. The vertical jump measuring system of claim 4 wherein the retention force of the inner channel member detent assembly is greater than the retention force of the retention force of the inner slide member detent assembly.

6. The vertical jump measuring system of claim 4 wherein the inner channel member comprises at least two inner channel member detent assemblies.

7. The vertical jump measuring system of claim 4 wherein the retention member is a spring.

8. The vertical jump measuring system of claim 4 wherein the inner channel member detent feature or the outer channel member detent feature comprises a hole or a surface depression.

9. The vertical jump measuring system of claim 3 further comprising at least a second inner channel member coupled between the first inner channel member and the outer channel member, the at least second inner channel member having a second inner channel member top cap, a second inner channel bottom cap with outer channel opening, at least a first inner channel detent assembly, and a second inner channel member detent feature.

10. The vertical jump measuring system of claim 3 wherein the inner slide assembly further comprises a strike rod coupled to the inner slide member disposed intermediate the indicator rod and the inner slide member and configured to constrain rotation of the plurality of indicator members.

11. The vertical jump measuring system of claim 3 wherein the outer channel member is configured to mount to an external surface.

12. The vertical jump measuring system of claim 3 wherein the outer channel member, inner channel member, and inner slide member are aluminum.

13. The vertical jump measuring system of claim 3 wherein each indicator member of the plurality of indicator members comprise three numeric indicia, each indicia corresponding with inner slide assembly retracted position, inner slide assembly expanded position, and inner channel member expanded position.

14. A method of using the vertical jump measuring system of claim 4 comprising the steps of:
mounting the system to an external surface such that that a top indicator member of the plurality of indicator members is at a predetermined maximum height;

extending the inner channel member and inner slide assembly to a height in which an athlete can stand and strike at least a bottom indicator members of a plurality of indicator members;
recording a numeric indicia of a highest indicator member stricken by the athlete in standing position;
retracting the inner channel member or inner slide assembly until the athlete can jump and strike an indicator member at a peak reach point of the athlete;
recording a second numeric indicia of a highest indicator member stricken by the athlete in jumping position; and
calculating a vertical jump measurement by calculating a difference between jumping and standing heights.

15. The method of using a vertical jump measuring system of claim 14 wherein the step of extending the first inner channel member and inner slide assembly further comprise the steps of:
applying a force greater than the retention force of the inner slide member detent assembly to the ball bearing, retracting the ball bearing further into the inner slide member detent assembly housing and out of the first inner channel member detent feature;
sliding the inner slide assembly downward along the first inner channel member vertical axis until the inner slide member top guide interferes with the first inner channel member bottom cap;
applying a force greater than the retention force of the first inner channel member detent assembly to the ball bearing, retracting the ball bearing further into the first inner channel detent assembly housing and out of the first inner channel detent feature; and
sliding the first inner channel member downward along the first inner channel member vertical axis until the first inner channel member top cap interferes with the outer channel member bottom cap.

16. The method of using a vertical jump measuring system of claim 14 wherein the step of retracing the inner channel member and inner slide assembly further comprise the steps of:
sliding the inner slide assembly upward along the first inner channel member vertical axis until the retention force biases the ball bearing into the inner channel member detent feature; and
sliding the first inner channel member upward along the outer channel member vertical axis until the retention force biases the ball bearing into the outer channel member detent feature.

17. A vertical jump measuring system comprising:
an inner slide assembly including an inner slide member, an indicator rod, and a plurality of indicator members, wherein the indicator rod is coupled to the inner slide member and the plurality of indicator members are rotatably coupled to the indicator rod;
the inner slide assembly partially nested within a first inner channel member, the inner slide assembly, in a first state, fixed using a detent mechanism coupled to the inner slide assembly and engaged with the inner channel member, in an inner slide assembly retracted position and in a second state the detent mechanism is disengaged from the inner channel member and the inner slide assembly freely traverses down the first inner channel member until the inner slide assembly is constrained by the inner channel member in an inner slide assembly extended position; and
the first inner channel member nested within an outer channel member, the first inner channel member, in a first state, fixed using an inner channel detent mechanism coupled to the inner channel member and engaged with the inner channel member in a first inner channel member retracted fixed and in a second state the inner channel detent mechanism is disengaged from the outer channel member and the inner channel member freely traverses down the outer channel member until the first inner channel member is constrained by the outer channel in a first inner channel member extended position.

18. The vertical jump measuring system of claim 17 where the detent mechanism and inner channel member detent mechanism comprise a ball bearing, a retention member, and a detent housing having a ball bearing opening smaller than the ball bearing; and
further wherein the ball bearing and the retention member are disposed with the detent housing and the retention member provides a retention force upon the ball bearing, biasing the ball bearing against the ball bearing opening, partially exposing the ball bearing until a force greater than the retention force biases the ball bearing back into the detent housing.

19. The vertical jump measuring system of claim 17 wherein the inner slide member further comprises an inner slide member top guide disposed at an inner slide member top end and an inner slide member detent assembly coupled to and disposed toward the inner slide member top end;
further wherein the first inner channel member comprises a first inner channel top cap disposed at a first inner channel member top end, a first inner channel bottom cap having an inner slide member opening disposed at a first inner channel bottom end, a first inner channel member detent feature disposed toward first inner channel top end, and a first inner channel detent assembly disposed towards the first inner channel member top end;
further wherein the outer channel member comprises an outer top cap disposed at an outer channel member top end, an outer channel bottom cap having an inner channel member opening disposed at an outer channel bottom end, and an outer channel member detent feature disposed toward outer channel member top end;
further, while in the inner slide assembly retracted position, the inner slide member detent assembly engages the first inner channel member detent feature and holds the inner slide member in a fixed position and while transitioning to the inner slide assembly extended position, the inner slide member detent assembly disengages the first inner channel member detent feature and traverses towards the first inner channel member bottom end through the inner slide member opening, and is stopped in the inner slide assembly extended position by an interference between the inner slide member top guide and the first inner channel bottom cap; and
further, while in the first inner channel retracted position, the first inner channel member detent assembly engages the outer channel member detent feature and holds the first inner channel member in a fixed position and while transitioning to the first inner channel member extended position, the inner channel member detent assembly disengages the outer channel member detent feature and traverses towards the outer channel member bottom end through the inner channel member opening, and is stopped in the first inner channel extended position by an interference between the first inner channel member top cap and the outer channel member bottom cap.

20. The vertical jump measuring system of claim 18 wherein each indicator member of the plurality of indicator members comprise three numeric indicia, each indicia corresponding with inner slide assembly retracted position, inner slide assembly expanded position, and inner channel member expanded position.

* * * * *